United States Patent
Nakazawa (10) Patent No.: US 9,702,981 B2
(45) Date of Patent: Jul. 11, 2017

(54) RADIATION DETECTOR, AND METHOD OF DETECTING RADIATION

(71) Applicant: Shimadzu Corporation, Kyoto (JP)

(72) Inventor: Masayuki Nakazawa, Kyoto (JP)

(73) Assignee: Shimadzu Corporation, Nishinokyo-Kuwabaracho, Nakagyo-ku, Kyoto-shi, Kyoto (JP)

( * ) Notice: Subject to any disclaimer, the term of this patent is extended or adjusted under 35 U.S.C. 154(b) by 0 days.

(21) Appl. No.: 14/481,937

(22) Filed: Sep. 10, 2014

(65) Prior Publication Data

US 2015/0069251 A1    Mar. 12, 2015

(30) Foreign Application Priority Data

Sep. 11, 2013  (JP) .................................. 2013-188222

(51) Int. Cl.
    *G01T 1/17*    (2006.01)
(52) U.S. Cl.
    CPC ..................................... *G01T 1/17* (2013.01)
(58) Field of Classification Search
    CPC ................................. G01T 1/208; G01T 1/17
    See application file for complete search history.

(56) References Cited

U.S. PATENT DOCUMENTS

| 6,903,344 B2 | 6/2005 | Breeding et al. |
| 2006/0015290 A1* | 1/2006 | Warburton et al. ........... 702/178 |
| 2011/0017918 A1* | 1/2011 | Baeumer et al. ........ 250/370.11 |

OTHER PUBLICATIONS

Haselman et al. "FPGA-Based Pulse Pileup Correction." NSS/MIC record Nov. 13, 2010.

* cited by examiner

*Primary Examiner* — David Porta
*Assistant Examiner* — Hugh H Maupin
(74) *Attorney, Agent, or Firm* — Muir Patent Law, PLLC (57) ABSTRACT

There is provided a radiation detector and a method of detecting radiation capable of more accurately correct fluorescence pileup. A table T in which the peak value h and the time course Tc of the intensity of fluorescence are related is previously prepared before radiation detection. The table T is based on actually-measured variation with time of the fluorescence intensity, and therefore faithfully represents the variation with time of fluorescence. When the occurrence of pileup is determined, the time course Tc corresponding to the peak value h immediately before the occurrence of the pileup is read out, and the time course Tc is subtracted from variation with time of the intensity data D to thereby estimate variation with time of the intensity of fluorescence after the occurrence of the pileup.

26 Claims, 8 Drawing Sheets

Occurrence of pileup

| Peak value | Time course |
|---|---|
| h0 | Tc0 |
| h1 | Tc1 |
| h2 | Tc2 |
| h3 | Tc3 |

RADIATION DETECTOR, AND METHOD OF DETECTING RADIATION

This application claims priority under 35 U.S.C. 119 to Japanese Patent Application No. JP2013-188222 filed on Sep. 11, 2013, and the entire disclosure of which is incorporated herein by reference in its entirety.

BACKGROUND

Field

The present disclosure relates to a radiation detector that corrects detection signals of annihilation radiation, and more particularly to a radiation detector that converts radiation into fluorescence to measure the fluorescence and is capable of eliminating the influence of afterglow of the fluorescence by correction. The present disclosure also relates to a method of detecting radiation.

Description of Related Art

A specific configuration of a conventional positron emission tomography (PET) device, which images radiopharmaceutical distributions, will be described. A conventional PET device is provided with a detector ring. The detector ring includes radiation detectors which detect radiation and are arranged in an annular form. The detection ring detects a pair of radiation rays (annihilation radiation) emitted from a radiopharmaceutical inside a subject, the radiation rays travelling opposite directions.

Figure 11:
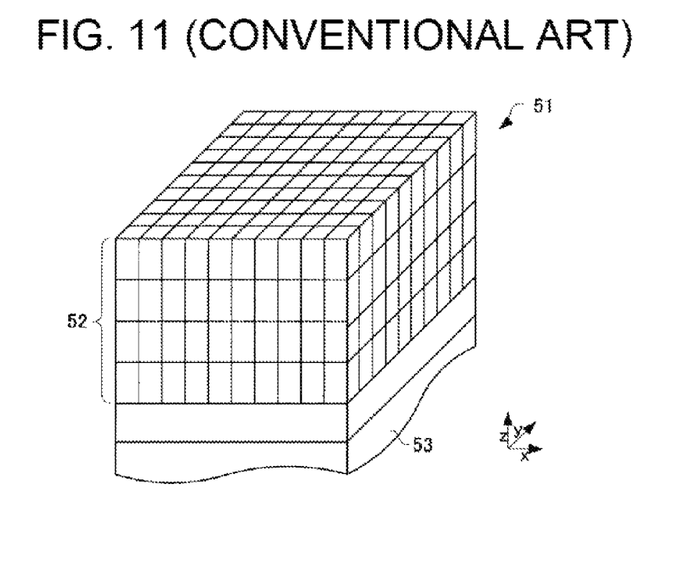
FIG. 11 is a schematic view showing a radiation detector having a conventional configuration.

The configuration of a radiation detector 51 will be described. As shown in FIG. 11, the radiation detector 51 is provided with a scintillator 52, in which scintillator crystals are three-dimensionally arrayed, and a photodetector 53, which detects fluorescence emitted from radiation absorbed in the scintillator 52. The photodetector 53 has a detection surface in which a large number of photodetection elements are arrayed in a matrix. Further, the detection surface of the photodetector 53 and one surface of the scintillator 52 are optically connected to each other.

When radiation enters the scintillator 52, fluorescence is generated inside the scintillator 52. It takes time for fluorescence to be completely attenuated. Therefore, when radiation enters the scintillator 52, the scintillator 52 continues to emit weak light for a while.

Figure 12:
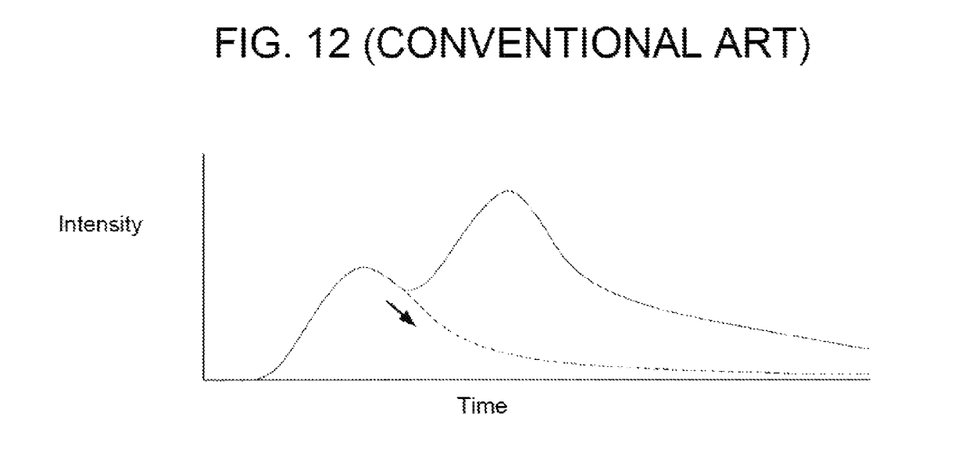
FIG. 12 is a conceptual diagram showing a drawback in the conventional configuration.

Therefore, in some cases, radiation may enter the scintillator 52 before the light emission of the scintillator 52 sufficiently stops. Accordingly, as shown in FIG. 12, light emissions from the scintillator 52 are detected in an overlapped state. Such a phenomenon is called fluorescence pileup. When pileup occurs, the radiation detector 51 cannot detect radiation correctly.

In view of the above, conventionally, countermeasures against pileup have been taken. For example, in a first method, a baseline is sequentially changed to detect piled-up fluorescence (see U.S. Pat. No. 6,903,344). Further, in a second method, piled-up fluorescence are separated into two detection signals by an estimation arithmetic operation (see M. D. Haselman et. al. "FPGA-Based Pulse Pileup Correction", NSS/MIC record Nov. 13, 2010).

However, conventional radiation detection has the following drawback, which make it difficult to sufficiently correct fluorescence pileup.

Figure 13:
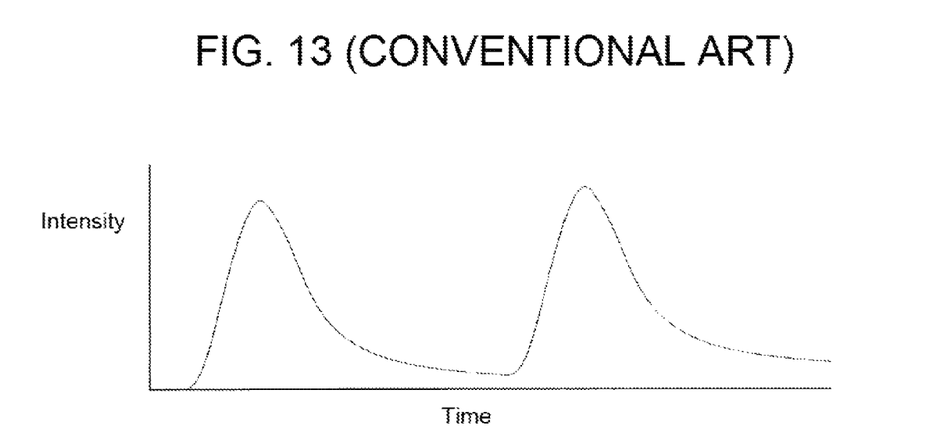
FIG. 13 is a conceptual diagram showing a drawback in the conventional configuration.

First, a method in which the baseline is sequentially changed may not have particular drawbacks when there is a sufficient time interval in the generation of fluorescence as shown in FIG. 13. However, when the generation of prior fluorescence and the generation of subsequent fluorescence are close to each other in time as shown in FIG. 12, the subsequent fluorescence starts glowing while the prior fluorescence is being largely attenuated. In the first method, the baseline for the subsequent fluorescence is fixed at a state immediately before the subsequent fluorescence starts glowing. However, an actual baseline largely varies in the negative direction as indicated by an arrow of FIG. 12 while the subsequent fluorescence is glowing. In this manner, in the first method, fluorescence pileup is corrected not on the basis of a correct baseline. Specifically, the subsequent fluorescence is excessively baseline-corrected, and therefore overestimated.

Further, in the second method in which an estimation arithmetic operation of piled-up fluorescence is performed, the inclination of attenuation of the prior fluorescence is calculated to correct a detection result of the subsequent fluorescence. However, an attenuation state of fluorescence cannot be represented by a simple function such as a linear function. Therefore, in order to accurately separate the piled-up fluorescence, it may be necessary to fit a complicated function to the detection result of fluorescence. Performing such an operation every time pileup occurs is difficult to achieve because a huge amount of calculations is typically required.

SUMMARY OF THE INVENTION

The disclosed embodiments have been developed in view of the above-mentioned and/or other problems in the related art. The disclosed embodiments of the present invention provide improvements upon existing methods and/or apparatuses.

The description herein of advantages and disadvantages of various features, embodiments, methods, and apparatus disclosed in other publications is in no way intended to limit the present invention. For example, certain features of the described embodiments may be capable of overcoming certain disadvantages and/or providing certain advantages, such as, e.g., disadvantages and/or advantages discussed herein, while retaining some or all of the features, embodiments, methods, and apparatus disclosed therein.

The embodiments of the present invention have been made in view of such circumstances, and one of objects thereof is to provide a radiation detector capable of more accurately correcting fluorescence pileup.

In certain embodiments, even when fluorescence pileup occurs, a radiation detector performs estimation by separating the piled-up fluorescence. One exemplary configuration is characterized in that a table in which a peak value and a time course of the intensity of fluorescence are related is previously prepared before radiation detection. The peak value is a maximum value of the intensity of fluorescence. The table is based on actually-measured variation with time of the fluorescence intensity, and therefore faithfully represents the variation with time of fluorescence. When the occurrence of pileup is determined, the time course corresponding to the peak value immediately before the occurrence of the pileup is read out from storage means, and the time course is subtracted from variation with time of the intensity data output from intensity data monitor means to thereby estimate variation with time of the intensity of fluorescence after the occurrence of the pileup. In this manner, it is possible to more accurately estimate the variation with time of the fluorescence intensity even when radiation is detected twice in a short period of time. Further, the variation with time can be estimated only by performing the subtraction processing. Therefore, a complicated arithmetic operation as performed in a conventional configuration is not required.

Further, in one embodiment, in the above radiation detector, it is more desirable that the time course of the intensity of fluorescence stored in the storage means be variable with time of the intensity of fluorescence monitored by the intensity data monitor means by applying radiation to a scintillator without occurrence of pileup.

The above configuration represents one embodiment of a radiation detector in accordance with the present invention. When the time course of the fluorescence intensity stored in the storage means is generated by actually measuring radiation without the occurrence of pileup, the variation with time of the fluorescence intensity can be more accurately estimated. This is because when pileup occurs at the time of generating the time course which is a reference of estimation, the variation with time of fluorescence is disturbed.

Further, in one embodiment of the above radiation detector, it is desirable that the intensity data monitor means monitor the intensity data by a free-run method.

The above configuration represents one embodiment of the radiation detector in accordance with the present invention. When the intensity data monitor means monitors the intensity data by a free-run method, it is possible to more accurately monitor the intensity data at a short time interval.

Further, in one embodiment of the above radiation detector, it is desirable that the intensity data monitor means generate the intensity data by digitizing output data from a photodetector, the output data being analog data.

The above configuration more specifically represents one embodiment of the radiation detector in accordance with the present invention. When the intensity data is generated by digitizing analog data output from the photodetector, the radiation detector can be configured to operate more reliably at higher speed.

Further, in one embodiment of the above radiation detector, it is desirable that estimation means operate not only for the intensity data in which two fluorescence are piled up, but also for the intensity data in which three or more fluorescence are piled up.

The above configuration more specifically represents one embodiment of the radiation detector in accordance with the present invention. When the estimation means operates for the intensity data in which three or more fluorescence are piled up, the radiation detector can be configured to have higher versatility.

In certain embodiment, even when fluorescence pileup occurs, the radiation detector performs estimation by separating the piled-up fluorescence. In one embodiment, the table in which the peak value and the time course of the intensity of fluorescence are related is previously prepared before radiation detection. The table may be based on actually-measured variation with time of the fluorescence intensity, and therefore may more faithfully represent the variation with time of fluorescence. When the occurrence of pileup is determined, the time course corresponding to the peak value immediately before the occurrence of the pileup is read out, and the time course is subtracted from variation with time of the intensity data to thereby estimate variation with time of the intensity of fluorescence after the occurrence of the pileup. In this manner, it is possible to accurately estimate the variation with time of the fluorescence intensity, and a complicated arithmetic operation as performed in a conventional configuration is not required.

In one embodiment, a radiation detector includes: a scintillator configured to convert radiation into fluorescence; a photodetector configured to detect the fluorescence; a storage configured to store therein a table in which a peak value which is a maximum value of an intensity of the fluorescence in a series of processes from emission of the fluorescence generated by the radiation entered the scintillator to attenuation of the fluorescence and a time course of the intensity of the fluorescence are related; an intensity data monitor configured to generate intensity data indicating the intensity of the fluorescence on a basis of an output from the photodetector and monitor the intensity data with time; a peak value acquisition block configured to acquire the peak value on the basis of the intensity data output from the intensity data monitor means; a pileup occurrence determination block configured to determine, on a basis of variation with time of the intensity data, occurrence of pileup which is a phenomenon in which, while the fluorescence generated by the radiation entered the scintillator is being attenuated, radiation again enters the scintillator, and the intensity of the fluorescence that has been continuously attenuated again increases; and an estimator configured to read out the time course corresponding to the peak value immediately before occurrence of pileup, the peak value being acquired by the peak value acquisition block, from the storage when the occurrence of the pileup is determined and subtracting the time course from the variation with time of the intensity data output from the intensity data monitor to estimate variation with time of the intensity of the fluorescence after the occurrence of the pileup.

In another embodiment, a method of detecting radiation, includes the steps of: converting radiation to fluorescence by a scintillator, detecting the fluorescence by a photodecector, and a storing table, wherein the table includes a peak value, which is a maximum value of intensity of the fluorescence in a series of processes from emission of the fluorescence generated by the radiation entered the scintillator to attenuation of the fluorescence, and a time course of the intensity of the fluorescence, the peak value and the time course being related; monitoring intensity data indicating the intensity of the fluorescence on a basis of an output from the photodetector with time; acquiring the peak value of the intensity data; determining, on a basis of variation with time of the intensity data, occurrence of pileup which is a phenomenon in which, while the fluorescence generated by the radiation entered the scintillator is being attenuated, radiation again enters the scintillator, and the intensity of the fluorescence that has been continuously attenuated again increases; when the occurrence of the pileup is determined, estimating variation with time of the intensity of the fluorescence after the occurrence of the pileup by reading out the time course corresponding to the peak value immediately before occurrence of the pileup and subtracting the time course from the variation with time of the intensity data; and detecting the radiation based on the estimated variation with time of the intensity of the fluorescence.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspects or features of other embodiments where applicable. The descriptions of aspects, features and/or advantages of particular embodiments should not be construed as limiting other embodiments or the claims.

In the drawings, the size and relative sizes of layers and regions may be exaggerated for clarity. Like numbers refer to like elements throughout. The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "and/or" includes any and all combinations of one or more of the associated listed items and may be abbreviated as "/". It will be understood that, although the terms first, second, etc. may be used herein to describe various elements, these elements should not be limited by these terms. Unless indicated otherwise, these terms are only used to distinguish one element from another. For example, a first object could be termed a second object, and, similarly, a second object could be termed a first object without departing from the teachings of the disclosure.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. It will be understood that when an element is referred to as being "connected" or "coupled" to or "on" another element, it can be directly connected or coupled to or on the other element or intervening elements may be present. In contrast, when an element is referred to as being "directly connected" or "directly coupled" to another element, there are no intervening elements present.

Other words used to describe the relationship between elements should be interpreted in a like fashion (e.g., "between" versus "directly between," "adjacent" versus "directly adjacent," etc.). However, the term "contact," as used herein refers to direct contact (i.e., touching) unless the context indicates otherwise. Terms such as "same," "planar," or "coplanar," as used herein when referring to orientation, layout, location, shapes, sizes, amounts, or other measures do not necessarily mean an exactly identical orientation, layout, location, shape, size, amount, or other measure, but are intended to encompass nearly identical orientation, layout, location, shapes, sizes, amounts, or other measures within acceptable variations that may occur, for example, due to manufacturing processes. The term "substantially" may be used herein to reflect this meaning.

It will be understood that, although the terms first, second, etc. may be used herein to describe various elements, these elements should not be limited by these terms. Unless indicated otherwise, these terms are only used to distinguish one element from another. For example, a first device could be termed a second device, and, similarly, a second device could be termed a first device without departing from the teachings of the disclosure.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

BRIEF DESCRIPTION OF THE DRAWINGS

The disclosed embodiments of the present invention are shown by way of example, and not limitation, in the accompanying figures.

DETAILED DESCRIPTION

In the following paragraphs, some embodiments of the invention will be described by way of example and not limitation. It should be understood based on this disclosure that various other modifications can be made by those in the art based on these illustrated embodiments.

The various "blocks" or "units" described herein may be implemented as devices formed of different elements configured to perform the described actions. For example, one of the blocks, such as the intensity data monitor block 11, may be formed of a combination of hardware with software and/or firmware. A block may be configured to perform certain actions by using or programming different circuitry, hardware, software, firmware, or combinations thereof. Other of the blocks may be formed similarly, and certain blocks may be physically combined, for example, to be implemented with the same hardware and/or firmware, having different software programs or algorithms to perform different tasks.

In general, the intensity monitor block 11, pileup generation determination block 12, peak value acquisition block 13, estimation block 14, and other elements of image processing apparatus may be comprised of one or more processors or computers configured by software, or may comprise software that works together with one or more processors and/or storage. Other elements of radiation detector 1, described further below, such as a main controller 21, console, 26, and storage 35 may constitute elements of such computer(s). A "computer" refers to one or more apparatus and/or one or more systems that are capable of accepting a structured input, processing the structured input according to prescribed rules, and producing results of the processing as output.

Examples of a computer may include: a general purpose computer; a stationary and/or portable computer; a computer having a single processor, multiple processors, or multi-core processors, which may operate in parallel and/or not in parallel; a supercomputer; a mainframe; a super mini-computer; a mini-computer; a workstation; a micro-computer; a server; a client; a telecommunications device with internet access; a tablet personal computer (PC); a personal digital assistant (PDA); application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, or a chip set; a system on a chip (SoC), or a multiprocessor system-on-chip (MPSoC).

"Software" refers to prescribed rules to operate a computer. Examples of software may include: code segments; instructions; applets; pre-compiled code; compiled code; interpreted code; computer programs; and programmed logic. A computer as described herein may include software in order to perform particular actions.

First Embodiment

Hereinafter, a radiation detector according to an embodiment of the present invention will be described. A γ (gamma) ray is an example of radiation.

<Exemplary Configuration of Radiation Detector>

Figure 1:
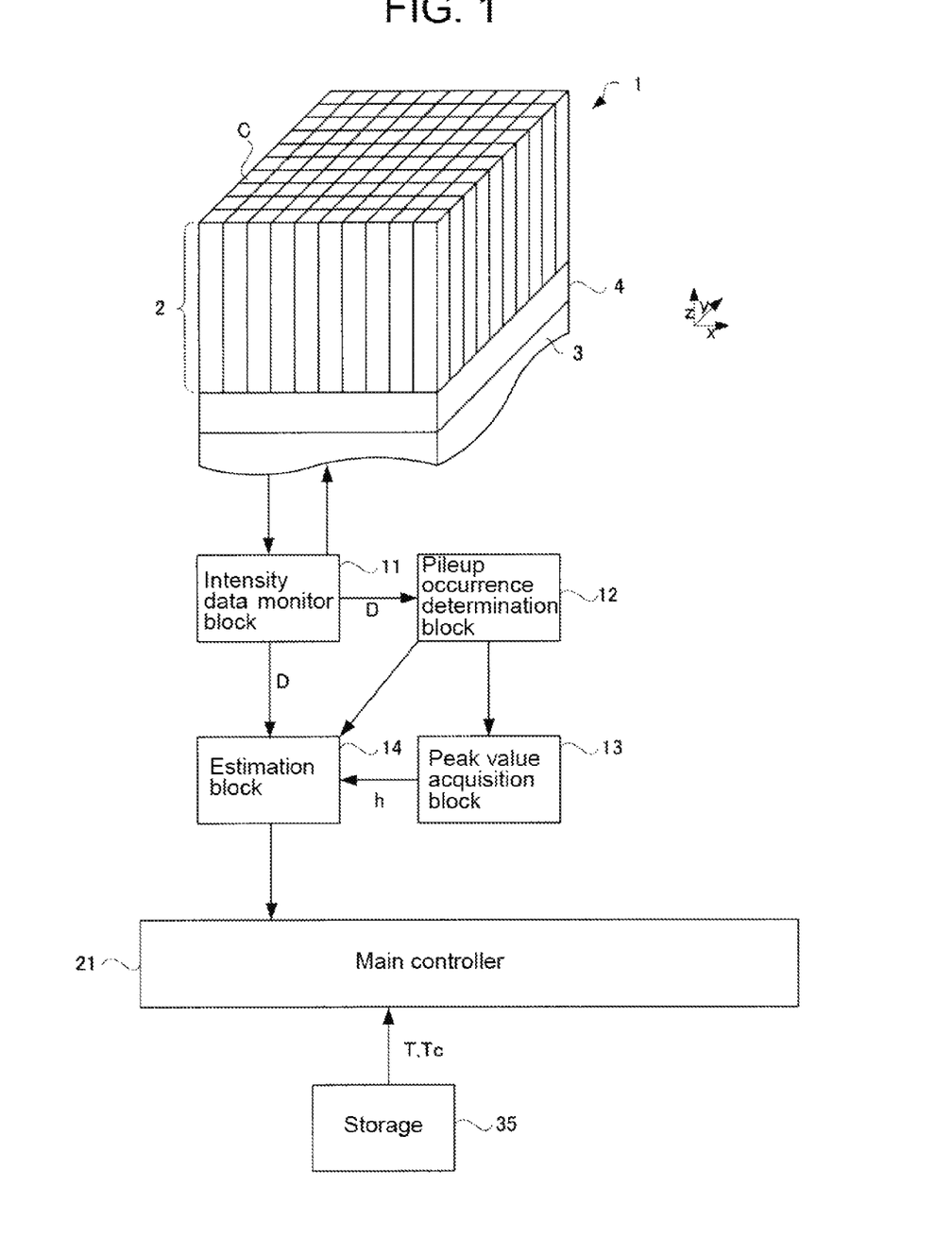
FIG. 1 is a functional block diagram showing the entire configuration of a radiation detector according to a first embodiment.

As shown in FIG. 1, a radiation detector 1 according to a first embodiment is provided with a scintillator 2 which includes vertically and horizontally arrayed scintillator crystals C, a photodetector 3 which is arranged under the lower face of the scintillator 2 and detects fluorescence emitted from the scintillator 2, and a light guide 4 which is interposed between the scintillator 2 and the photodetector 3. Each of the scintillator crystals C is composed of Ce-doped $Lu_{2(1-X)}Y_{2X}SiO_5$ (hereinafter, referred to as LYSO). When radiation enters the scintillator 2, the radiation is converted into fluorescence.

The photodetector 3 detects fluorescence generated in the scintillator 2. The photodetector 3 has a position discrimination function, and therefore can discriminate from which scintillator crystal C fluorescence generated in the scintillator 2 is derived. The light guide 4 is provided for guiding fluorescence generated in the scintillator 2 to the photodetector 3. Therefore, the light guide 4 is optically coupled to the scintillator 2 and the photodetector 3.

An intensity data monitor block 11 transmits sampling signals to the photodetector 3 at equal intervals. The sampling signal is an order for the photodetector 3 to transmit data. In one embodiment, the photodetector 3 calculates a fluorescence detection signal to the intensity data monitor block 11 every time the sampling signal is transmitted. Such a method in which the generation of fluorescence is monitored at a constant time interval regardless of a state of detecting fluorescence by the photodetector 3 is called a free-run method. The intensity data monitor block 11 monitors intensity data D by a free-run method. The intensity data monitor block 11 corresponds to intensity data monitor means of the present invention.

The fluorescence detection signal (output data) output from the photodetector 3 is essentially analog data. The intensity data monitor block 11 acquires output data from the photodetector 3, and then digitizes the acquired output data to generate the intensity data D which indicates the intensity of fluorescence. The intensity data D is generated with time on the basis of output data from the photodetector 3, the output data being successively input to the intensity data monitor block 11. Therefore, the intensity data monitor block 11 monitors the intensity data D with time. However, typically the intensity of fluorescence cannot be accurately monitored only by the operation of the intensity data monitor block 11 because fluorescence may sometimes cause pileup. A pileup occurrence determination block 12, a peak value acquisition block 13, and an estimation block 14 all described below are provided for taking the pileup into consideration.

<Fluorescence Pileup>

Figure 2:
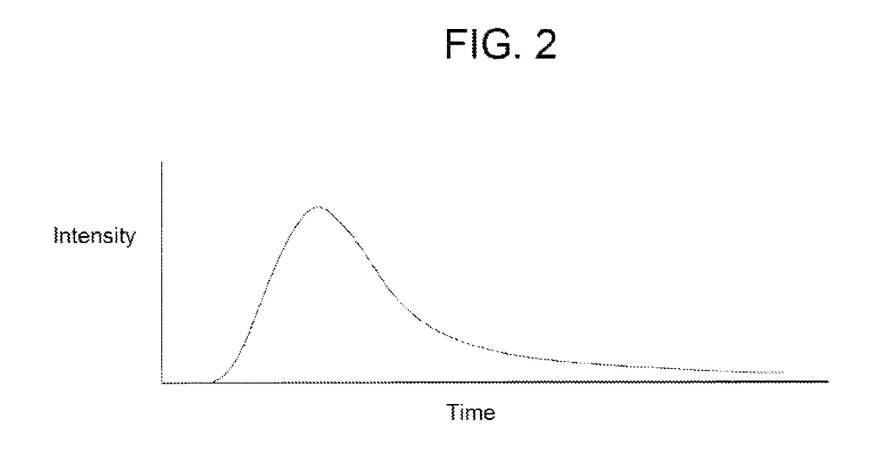
FIG. 2 is a conceptual diagram showing variation with time of intensity data according to the first embodiment.

Prior to describing the operations of the respective blocks 12, 13, and 14, fluorescence pileup will be described. FIG. 2 shows variation with time of the intensity data D when the radiation detector 1 detects radiation only once. When radiation enters the scintillator 2, the intensity of fluorescence increases and reaches a high level as shown in FIG. 2. Then, the intensity of fluorescence is gradually attenuated, taking time longer than time during which the intensity of fluorescence increases. The pileup occurrence determination block 12 corresponds to pileup occurrence determination means of the present invention.

Figure 3:
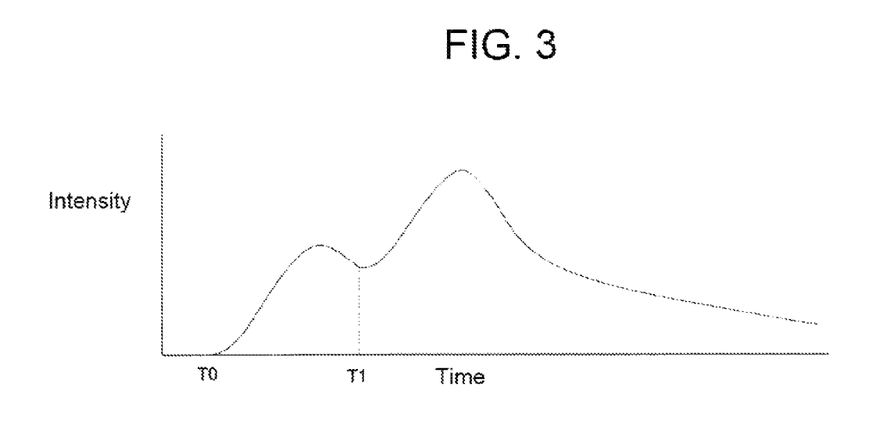
FIG. 3 is a conceptual diagram showing fluorescence pileup according to the first embodiment.

FIG. 3 shows variation with time of the intensity data D when the radiation detector 1 detects radiation twice. First, when the first radiation enters the scintillator 2, an increase/decrease of the fluorescence intensity described with reference to FIG. 2 occurs. Therefore, the variation with time of the fluorescence intensity shown in FIG. 3 exhibits the same behavior as that shown in FIG. 2 from a time point T0 at which fluorescence starts being generated until a time point T1. Assume that radiation again enters the scintillator 2 at the time point T1, for example, the second radiation enters the scintillator 2 before the generated fluorescence is sufficiently attenuated. In this case, the intensity of fluorescence that should have been continuously attenuated again increases from the time point T1 as shown in FIG. 3.

Such a phenomenon in which, while fluorescence generated by radiation that has entered the scintillator 2 is being attenuated, radiation again enters the scintillator 2, and the intensity of the fluorescence that has been continuously attenuated again increases is called fluorescence pileup. For example, fluorescence pileup may occur when radiation enters the scintillator 2 twice in a short time. Therefore, even when the subsequent fluorescence is generated in the scintillator 2 after the prior fluorescence sufficiently disappears, such a phenomenon is not called pileup.

When such pileup occurs, the intensity data D output from the intensity data monitor block 11 is disturbed. In order to achieve more accurate radiation detection, it is important to eliminate or reduce the disturbance. Accordingly, in the configuration of the first embodiment, a configuration for separating two piled-up fluorescence is provided. In one embodiment, the blocks 12, 13, and 14 provided in the radiation detector 1 of the first embodiment achieve such a configuration. Hereinafter, the operations of these blocks will be described in order.

<Operation of Pileup Occurrence Determination Block>

The pileup occurrence determination block 12 determines the occurrence of fluorescence pileup on the basis of the variation with time of the intensity data D. Hereinafter, a detailed operation thereof will be described. The intensity data D is successively transmitted to the pileup occurrence determination block 12 from the intensity data monitor block 11. Accordingly, the pileup occurrence determination block 12 can know the variation with time of the intensity data D.

In the operation of the pileup occurrence determination block 12, a threshold n is used. The threshold n is a set value stored in a storage block 35. The pileup occurrence determination block 12 reads out data indicating the threshold n from the storage block 35 to operate. The storage block 35 corresponds to storage means of the present invention.

Figure 4:
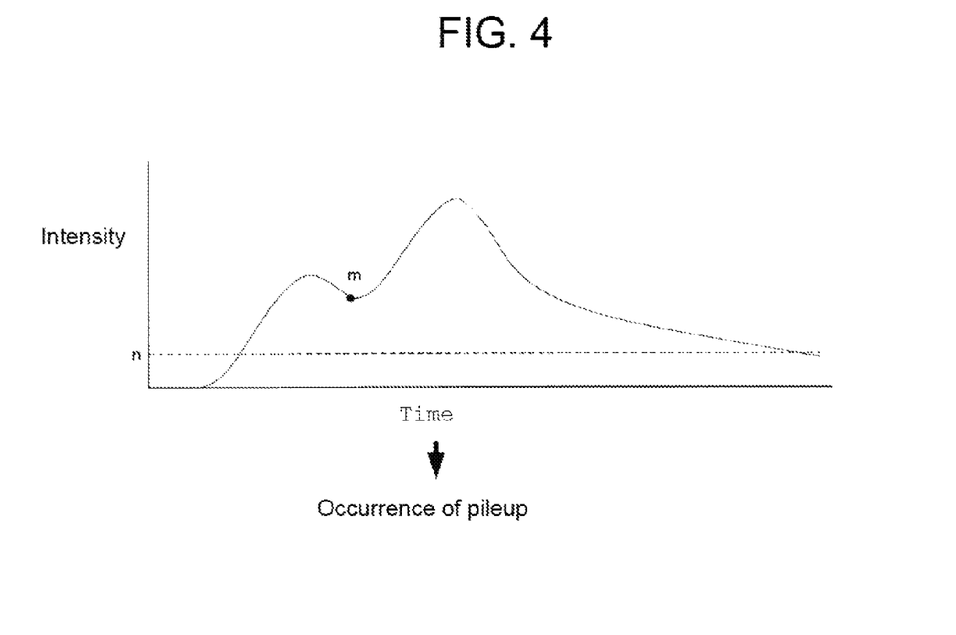
FIG. 4 is a conceptual diagram showing the operation of a pileup occurrence determination block according to the first embodiment.

FIG. 4 shows the operation of the pileup occurrence determination block 12. The pileup occurrence determination block 12 acquires the intensity and a differential value of the intensity for each piece of the intensity data D output from the intensity data monitor block 11. Then, when a specific condition is satisfied, the pileup occurrence determination block 12 determines that fluorescence pileup shown in FIG. 3 has occurred. The condition is whether the minimum value in the variation with time of the intensity data D is equal to or higher than the threshold n. Specifically, when the minimum value is equal to the threshold n, the pileup is determined to occur.

Setting such a condition makes it possible to more accurately determine the occurrence of pileup. First, the existence of the minimum point in the intensity indicates that the intensity of fluorescence first decreases and then starts increasing in the middle, that is, radiation divisionally enters the scintillator 2 twice. More specifically, radiation enters the scintillator 2 once before a point at which the intensity becomes minimum and once after the point.

If it is determined that radiation has divisionally entered the scintillator 2 twice, it may not be possible to know whether pileup occurs because radiation may have entered the scintillator 2 after sufficient attenuation of fluorescence. It is more realistic to regard such a case as a single radiation detection shown in FIG. 2.

Therefore, the pileup occurrence determination block 12 performs the determination of pileup on the basis of whether the minimum value is equal to or higher than the threshold n. In one embodiment, when the minimum value is equal to or higher than the threshold n, it can be confirmed that radiation has entered the scintillator 2 before sufficient attenuation of fluorescence because fluorescence is attenuated with gradually becoming weaker. The threshold n is a parameter used for determining pileup, and can be appropriately adjusted depending on a state of the radiation detection.

The operation of the pileup occurrence determination block 12 when variation with time of the intensity data D as shown in FIG. 4 is acquired will be described. The pileup occurrence determination block 12 recognizes the existence of a minimum point m in the variation with time of the intensity data D, and further recognizes that a minimum value corresponding to the minimum point m is equal to or higher than the threshold n. Therefore, in such a case, the pileup occurrence determination block 12 determines that pileup has occurred around a time point at which the minimum point m is generated.

<Operation of Peak Value Acquisition Block>

When the pileup occurrence determination block 12 recognizes the occurrence of pileup, the pileup occurrence determination block 12 transmits this fact to the peak value acquisition block 13. The peak value acquisition block 13 acquires a peak value on the basis of the intensity data D output from the intensity data monitor block 11. The peak value is a maximum value of the intensity of fluorescence in a series of processes from the emission of fluorescence generated by radiation entered the scintillator 2 to the attenuation of the generated fluorescence. The peak value acquisition block 13 corresponds to peak value acquisition means of the present invention.

Figure 5:
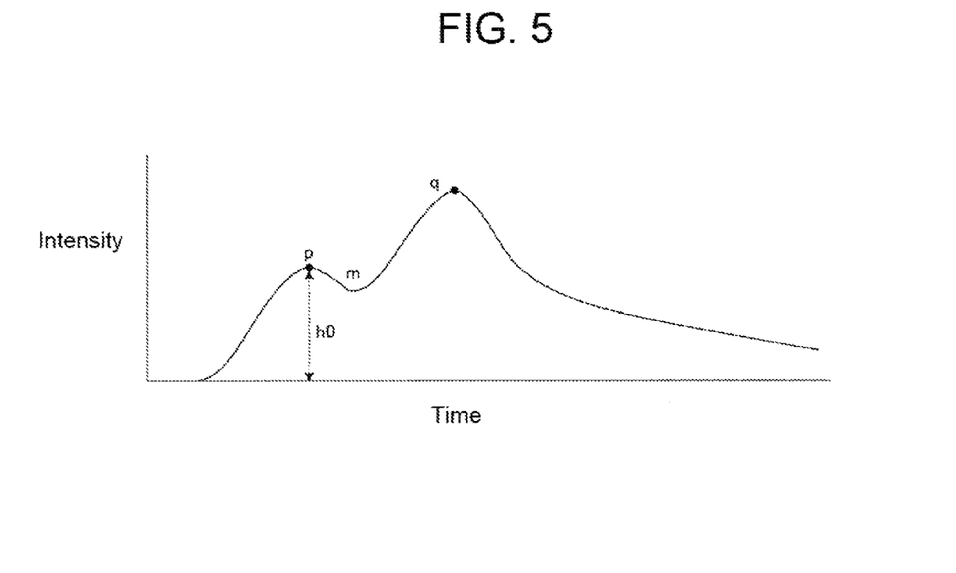
FIG. 5 is a conceptual diagram showing the operation of a peak value acquisition block according to the first embodiment.

A specific operation of the peak value acquisition block 13 will be described. The intensity data D is transmitted from the intensity data monitor block 11 with time. When the pileup occurrence determination block 12 determines the occurrence of pileup, the pileup occurrence determination block 12 transmits a signal indicating the occurrence of pileup and data indicating a time point at which the minimum point m as a reference for the determination of pileup is generated to the peak value acquisition block 13. When the signal and the data are transmitted from the pileup occurrence determination block 12, the peak value acquisition block 13 first acquires a maximum point p which appears prior to the time point at which the minimum point m is generated as shown in FIG. 5. The maximum point p corresponds to a maximum point which first appears when viewing the intensity data D in a direction going back in time from the time point at which the minimum point m is generated. A maximum point q relating to the subsequent fluorescence shown in FIG. 5 appears after the time point at which the minimum point m is generated. Therefore, the maximum point q is not recognized as the maximum point by the peak value acquisition block 13.

Then, the peak value acquisition block 13 acquires a maximum value which is the intensity at the maximum point p, and recognizes the acquired maximum value as a peak value h0. The peak value acquired by the peak value acquisition block 13 in this manner is a peak value relating to the prior radiation that has first entered the scintillator 2 among the two radiations which have entered the scintillator 2. For example, in one embodiment, the peak value acquisition block 13 acquires a peak value immediately before the occurrence of pileup.

<Table>

Figure 6:
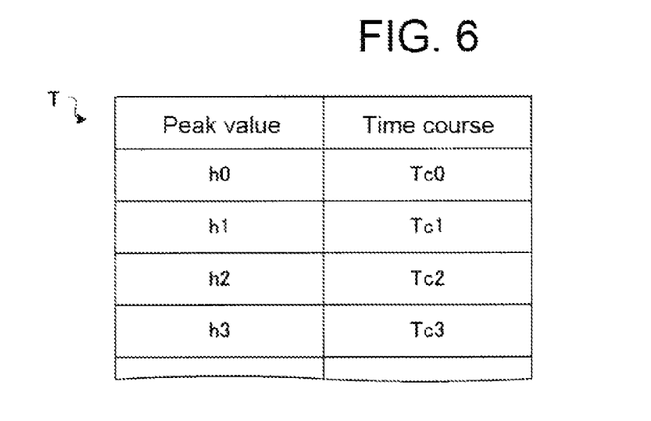
FIG. 6 is a conceptual diagram showing a table according to the first embodiment.

Prior to describing the estimation block 14, a table T used in the estimation block 14 will be described. The table T, according to one embodiment, is stored in the storage block 35, and the estimation block 14 appropriately reads out and uses the table T. FIG. 6 schematically shows the table T according to one exemplary embodiment. In the table T, different peak values h and time courses Tc of the intensity of fluorescence are related. The table T is provided for the purpose of estimating variation with time of fluorescence generated in the scintillator 2. The estimation block 14 corresponds to estimation means of the present invention.

Figure 7:
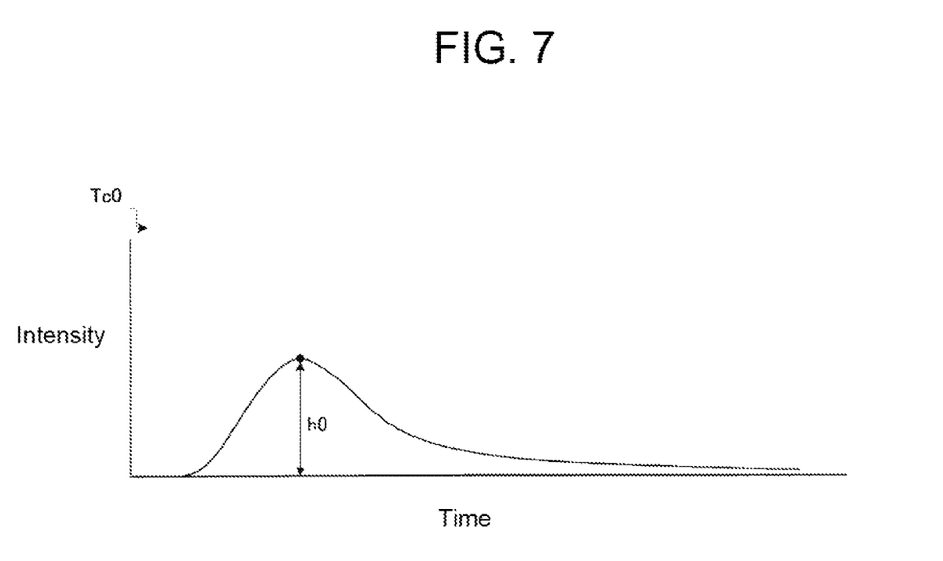
FIG. 7 is a conceptual diagram showing a peak value and a time course according to the first embodiment.

FIG. 7 shows the peak value h0 and a time course Tc0 related to the peak value h0. The time course Tc0 is configured on the basis of a measured value when a single radiation is detected by the radiation detector 1. Thus, the time course Tc0 represents a detection result when radiation is detected without fluorescence pileup.

If the intensity of fluorescence generated in the scintillator 2 is always constant, it is easy to predict an increasing/decreasing state of fluorescence because fluorescence generated in the scintillator 2 should vary with time while always following the same course. However, the intensity of fluorescence actually generated in the scintillator 2 is not necessarily constant. Therefore, an increasing/decreasing state of fluorescence may vary depending on the intensity of fluorescence. Therefore, in the configuration of the first embodiment, the plurality of time courses Tc corresponding to different intensities of fluorescence are prepared for more accurately estimating the variation with time of fluorescence generated in the scintillator 2.

In this case, the peak value can be used as an index of the intensity of fluorescence. Specifically, when the peak value in variation with time of fluorescence is large, it can be recognized that the variation with time relates to fluorescence having high intensity. Similarly, when the peak value in variation with time of fluorescence is small, it can be recognized that the variation with time relates to fluorescence having low intensity. In this manner, when peak values are the same as each other, the variation with time of fluorescence is defined. Therefore, it is possible to estimate how fluorescence generated in the scintillator 2 increases and decreases merely by finding the peak value.

FIG. 7 shows only the peak value h0 and the time course Tc0 related to the peak value h0. However, the time courses Tc1, Tc2, and Tc3 may be correlated to the other respective peak values h1, h2, and h3 of the table T (see FIG. 6).

Therefore, in the configuration of the first embodiment, the table T is prepared before performing radiation detection. A method of generating the table T will be described. The table T can be obtained by detecting radiation using the radiation detector 1 having the same configuration as that described with reference to FIG. 1. At this time, in order to prevent the occurrence of fluorescence pileup, the radiation detection is performed while sufficiently reducing the dose of radiation. By continuously performing the radiation detection, fluorescence with various intensities are detected. Variation with time of the intensity data D of each of the fluorescence is monitored in the same manner as the operation of the intensity data monitor block 11 described above and a result of the monitoring is transmitted to the peak value acquisition block 13 to acquire the peak value to thereby obtain the table T. In an actual table T, the variation with time of the intensity data D is listed in the descending order of the peak value.

Further, in one embodiment when generating the table T, the intensity data D which is acquired when fluorescence pileup occurs may not be used in the generation of the table T. In this case, determination of the occurrence of pileup may be performed by the pileup occurrence determination block 12. In any case, the time course Tc of the fluorescence intensity stored in the storage block 35 is varied with time of the intensity of fluorescence monitored by the intensity data monitor block 11 by applying radiation to the scintillator 2 without the occurrence of pileup.

When the table T is generated using a detector that has the same configuration as the radiation detector 1 which is used in actual detection, the variation with time of fluorescence can be more accurately estimated. The variation with time of the intensity data D when detecting fluorescence varies depending on the configuration of a radiation detector. Therefore, variation with time of the intensity data D to be output varies when the configurations of radiation detectors differ from each other even with the same fluorescence generated in the scintillator 2. In the configuration of the first embodiment, radiation is detected under the same condition as the condition in actual radiation detection to generate the table T. Therefore, a pattern of variation with time of fluorescence can be more accurately estimated.

<Operation of Estimation Block>

In one embodiment, when the pileup occurrence determination block 12 recognizes the occurrence of pileup, the peak value acquisition block 13 transmits the peak value h0 to the estimation block 14. When the occurrence of pileup is determined, the estimation block 14 reads out the time course Tc0 that corresponds to the peak value h0 with reference to the table T from the storage block 35 to thereby estimate variation with time of the intensity of the prior fluorescence that has been first generated among piled-up fluorescence. Then, the time course is subtracted from variation with time of the intensity data D output from the intensity data monitor block 11 to thereby estimate variation with time of the intensity of the subsequent fluorescence that has been subsequently generated in the scintillator 2 among the piled-up fluorescence, or variation with time of the intensity of fluorescence after the occurrence of pileup. In this manner, the estimation block 14 estimates the variation with time of the intensity of each of the piled-up fluorescence.

Figure 8:
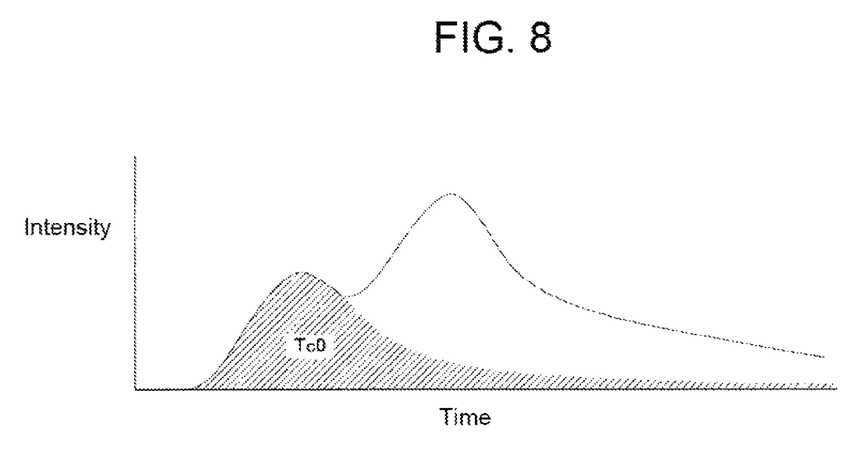
FIG. 8 is a conceptual diagram showing the operation of an estimation block according to the first embodiment.

FIG. 8 specifically shows the operation of the estimation block 14. The estimation block 14 subtracts a part corresponding to the time course Tc0 indicated by oblique lines in a part in which pileup is recognized in the variation with time of the intensity data D. Time-alignment between the variation with time of the intensity data D and the time course Tc0 is performed so that the maximum point p in the peak value h0 in the variation with time of the intensity data D and the maximum point of the time course Tc0 are located at the same time point.

Figure 9:
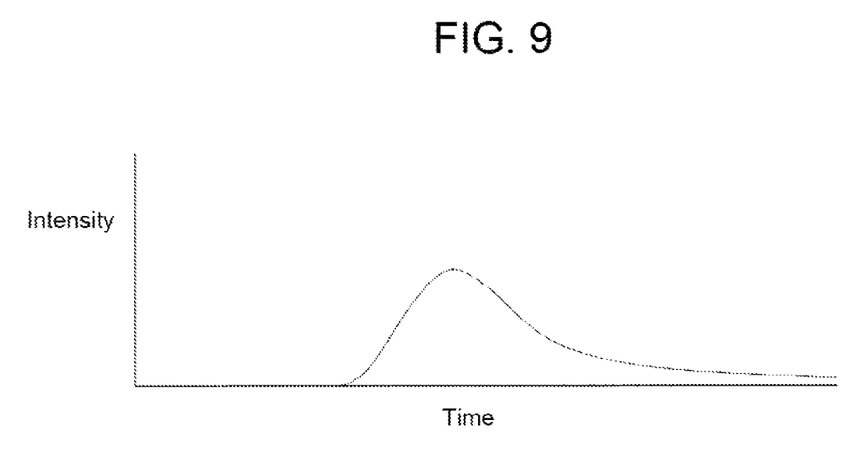
FIG. 9 is a conceptual diagram showing the operation of the estimation block according to the first embodiment.

FIG. 9 shows variation with time after performing the subtraction processing. As shown in FIG. 9, the influence of the prior radiation that has first entered the scintillator 2 in the entrance of radiation performed twice is eliminated from the variation with time by the subtraction processing. Then, the operation of the estimation block 14 is finished.

Figure 10:
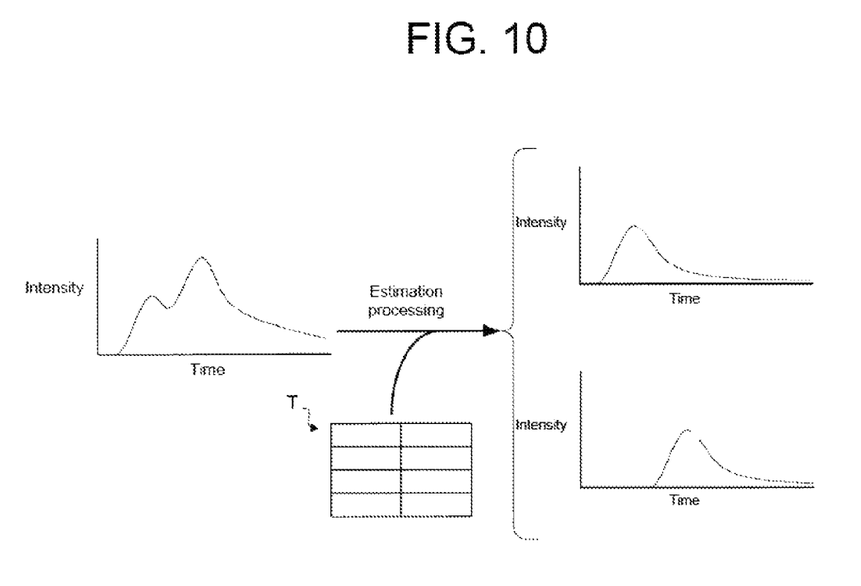
FIG. 10 is a conceptual diagram showing the operation of the estimation block according to the first embodiment.

FIG. 10 schematically shows the operation of the estimation block 14 described above. When the variation with time of the intensity data D in which pileup occurs is input to the estimation block 14, the estimation block 14 reads out the time course Tc0 with reference to the table T, and estimates that the time course Tc0 is varied with time of fluorescence that corresponds to the prior radiation that has first entered the scintillator 2 among two piled-up fluorescence. For example, the time course Tc0 represents variation with time of the fluorescence intensity corresponding to the prior radiation that has first entered the scintillator 2 in the entrance of radiation performed twice which causes fluorescence pileup. Then the estimation block 14 performs subtraction processing using the time course Tc0. The variation with time after the subtraction processing obtained in this manner represents variation with time of the fluorescence intensity corresponding to the subsequent radiation that has subsequently entered the scintillator 2. For example, detection data of the piled-up fluorescence may be separated by the estimation block 14 into a component corresponding to fluorescence generated in the scintillator 2 before the occurrence of pileup and a component corresponding to fluorescence generated in the scintillator 2 at a time point when the pileup occurs.

<Other Configuration of Radiation Detector>

In one embodiment, the radiation detector 1 is provided with a main control block 21 which totally controls each of the blocks. The main control block 21 includes a CPU, and achieves each of the blocks 11, 12, 13, and 14 by executing various programs. The above blocks may be achieved separately by control devices corresponding to the respective blocks. Further, in one embodiment, the storage block 35 stores therein all data relating to control of the radiation detector 1 such as the threshold and the table.

As described above, even when fluorescence pileup occurs, the radiation detector 1 of the present disclosed embodiments performs estimation by separating the piled-up fluorescence. The configuration of the present disclosed embodiments is characterized in that the table T in which the peak value h and the time course Tc of the intensity of fluorescence are related is previously prepared before radiation detection. The peak value h is the maximum value of the intensity of fluorescence. The table T is based on actually-measured variation with time of the fluorescence intensity, and therefore faithfully represents the variation with time of fluorescence. In the present disclosure, when the occurrence of pileup is determined, the time course Tc corresponding to the peak value h immediately before the occurrence of the pileup is read out, and the time course Tc is subtracted from variation with time of the intensity data D to thereby estimate variation with time of the intensity of fluorescence after the occurrence of the pileup. In this manner, it is possible to more accurately estimate the variation with time of the fluorescence intensity even when radiation is detected twice in a short period of time. Further, in the present embodiments, the variation with time can be estimated only by performing the subtraction processing. Therefore, a complicated arithmetic operation as performed in a conventional configuration is not required.

Further, when the time course Tc of the fluorescence intensity stored in the storage block 35 is generated by actually measuring radiation without the occurrence of pileup, the variation with time of the fluorescence intensity can be more accurately estimated. This is because when pileup occurs at the time of generating the time course Tc which is a reference of estimation, the variation with time of fluorescence is disturbed.

When the intensity data monitor block 11 monitors the intensity data D by a free-run method as described above, it is possible to accurately monitor the intensity data D at a short time interval.

When the intensity data D is generated by digitizing analog data output from the photodetector 3, the radiation detector 1 can be configured to operate more reliably at higher speed.

The present invention is not limited to the above configuration, and can be modified in various ways.

For example, although data processing is performed on the intensity data D in which two fluorescence are piled up in the above configuration, the present invention is not limited thereto. The estimation block 14 may operate also for intensity data D in which three or more fluorescence emitted from the scintillator 2 are piled up. In this case, the estimation block 14 calculates the peak value h in time series order from the first emitted fluorescence among the piled-up fluorescence, and acquires the time course Tc corresponding to the peak value h. Then, the estimation block 14 removes the first emitted fluorescence from the intensity data D by performing subtraction, and calculates the peak value of the second emitted fluorescence on the basis of a result of the subtraction. Then, the estimation block 14 acquires a time course corresponding to the calculated peak value (the time course of the second emitted fluorescence), and subtracts the time course of the second emitted fluorescence from the intensity data D after the subtraction processing. By successively repeating the acquisition of the time course and the subtraction processing, the estimation block 14 can separate and acquire variation with time of each fluorescence from the intensity data D in which three or more fluorescence emitted from the scintillator 2 are piled up. When the estimation block 14 operates for the intensity data D in which three or more fluorescence are piled up in this manner, the radiation detector 1 can be configured to have higher versatility.

Furthermore, the set values in the above embodiment are merely examples. Therefore, the set values can be freely changed.

In addition, the scintillator crystal in the above embodiment is composed of LYSO. However, in the present invention, the scintillator crystal may be composed of another material such as, for example, LGSO ($Lu_{2(1-x)}G_{2x}SiO_5$) and GSO ($Gd_2SiO_5$) instead of LYSO. According to this modification, a radiation detector manufacturing method that can provide a radiation detector at lower cost can be provided.

Yet still, although the photodetector is composed of a photomultiplier tube in the above embodiment, the present invention is not limited thereto. Instead of a photomultiplier tube, a photodiode, an avalanche photodiode, a semiconductor detector or the like may be used.

The terms and descriptions used herein are used only for explanatory purposes and the present invention is not limited to them. Accordingly, the present invention allows various design-changes falling within the scope of the following claims.

While illustrative embodiments of the invention have been described herein, the present invention is not limited to the various embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

In this disclosure and during the prosecution of this application, the terminology "present invention" or "invention" is meant as a non-specific, general reference and may be used as a reference to one or more aspects within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features.

What is claimed is:

1. A radiation detector comprising:
   a scintillator configured to convert radiation into fluorescence;
   a photodetector configured to detect fluorescence emitted by the scintillator;
   storage means for storing therein a plurality of different first peak values and a plurality of different first time courses associated with a respective one of the first peak values, each time course representing an intensity of a corresponding fluorescence emission over time and each first peak value representing a maximum value of intensity of the fluorescence emission associated with the corresponding first peak value;
   intensity data monitor means for providing intensity data indicating the intensity of a detected fluorescence emission on a basis of outputs from the photodetector;
   peak value acquisition means for acquiring at least one peak value of the detected fluorescence emission on the basis of the intensity data output from the intensity data monitor means;
   pileup occurrence determination means for determining an occurrence of a pileup on a basis of the intensity data, the pileup comprising a situation in which, while the intensity of the detected fluorescence emission that is emitted by the scintillator in response to first radiation that has entered the scintillator is attenuating, second radiation enters the scintillator causing the intensity of the detected fluorescence emission that had been attenuating to increase; and estimation means for, in response to a determination of the occurrence of the pileup by the pileup occurrence determination means, estimating a portion of the intensity of the detected fluorescence emission that was caused by the second radiation entering the scintillator by obtaining a selected one of the plurality of first time courses from the storage means corresponding to a peak value of the detected fluorescence emission, the peak value of the detected fluorescence emission corresponding to a magnitude of intensity of a local maximum of the detected fluorescence emission that most recently occurred before the determination of the occurrence of the pileup, the peak value being acquired by the peak value acquisition means, and subtracting the selected first time course from a second time course of the intensity of the detected fluorescence emission over time.

2. The radiation detector according to claim 1, wherein the each of the first time courses stored in the storage means represents a variation with time of the intensity of the corresponding fluorescence emission when no pileup occurs in the scintillator.

3. The radiation detector according to claim 1, wherein the intensity data monitor means is configured to monitor the intensity data by a free-run method.

4. The radiation detector according to claim 1, wherein the intensity data monitor means is configured to generate the intensity data by digitizing output data from the photodetector, the output data being analog data.

5. The radiation detector according to claim 1, wherein the estimation means is configured to estimate at least three portions of the intensity of the detected fluorescence emission corresponding to at least the first radiation, the second radiation and a third radiation entering the scintillator during the occurrence of plural pileup.

6. The radiation detector according to claim 1, wherein the estimation means is configured to select plural first time courses, each selected first time course selected in response to a corresponding magnitude of plural peak values of the detected fluorescence emission.

7. The radiation detector according to claim 6, wherein the estimation means is configured to subtract the selected plural first time courses from the second time course of the intensity of the detected fluorescence emission.

8. The radiation detector according to claim 1, wherein each of the first time courses comprise data representing intensity measurements of the corresponding fluorescence emission over time.

9. The radiation detector according to claim 1, wherein the storage means stores the plurality of first peak values and the plurality of first time courses in a table, each row entry of the table storing and associating a different one of the first peak values and a different corresponding one of the plurality of first time courses.

10. The radiation detector according to claim 1, wherein the pileup occurrence determination means determines the occurrence of a pileup by comparing a magnitude of a local minimum of the second time course of the intensity of the detected fluorescence emission to a predetermined threshold.

11. The radiation detector according to claim 1, wherein estimation means estimates the portion of intensity of the detected fluorescence emission that was caused by the second radiation as an intensity of fluorescence that varies with time.

12. A radiation detector comprising:
a scintillator configured to convert radiation into fluorescence;
a photodetector configured to detect fluorescence emitted by the scintillator;
a storage configured to store therein a plurality of different first peak values and a plurality of different first time courses associated with a respective one of the first peak values, each first time course representing an intensity of a corresponding fluorescence emission over time and each first peak value representing a maximum value of an intensity of the corresponding fluorescence emission associated with the corresponding first peak value;
an intensity data monitor configured to provide intensity data indicating the intensity of a detected fluorescence emission on a basis outputs of the photodetector; and
a processor configured by software:
to acquire at least one peak value of the detected fluorescence based on the intensity data,
to determine an occurrence of a pileup in response to the intensity data, the pileup comprising a situation in which, while the intensity of the detected fluorescence emission that is emitted by the scintillator in response to first radiation that has entered the scintillator is attenuating, second radiation enters the scintillator causing the intensity of the detected fluorescence that had been attenuating to increase, and
to estimate a portion of the intensity of the detected fluorescence emission that was caused by the second radiation entering the scintillator by, in response to determining the occurrence of the pileup, selecting one of the plurality of first time courses stored in storage that corresponds to a peak value of the detected fluorescence emission the peak value of the detected fluorescence emission corresponding to a magnitude of intensity of a local maximum of the detected fluorescence emission that most recent occurred before the determination of the occurrence of the pileup, and subtracting the selected first time course a second time course of the intensity of the detected fluorescence emission over time.

13. The radiation detector according to claim 12, wherein each of the first time courses stored in the storage represents a variation with time of the intensity of the corresponding fluorescence emission when no pileup occurs in the scintillator.

14. The radiation detector according to claim 12, wherein the intensity data monitor is configured to monitor the intensity data by a free-run method.

15. The radiation detector according to claim 12, wherein the intensity data monitor is configured to generate the intensity data by digitizing output data from the photodetector, the output data being analog data.

16. The radiation detector according to claim 12, wherein the processor is configured to estimate at least three portions of the intensity of the detected fluorescence emission corresponding to at least the first radiation, the second radiation and a third radiation entering the scintillator during the occurrence of plural pileups.

17. A method of detecting radiation, the method comprising the steps of:
converting radiation into fluorescence by a scintillator;
detecting fluorescence emitted by the scintillator;
providing storage of a plurality of different first peak values and a plurality of different first time courses each associated with a respective one of the first peak values, each first time course representing an intensity of a corresponding fluorescence emission over time and each first peak value representing a maximum value of intensity of the fluorescence emission associated with the corresponding first peak value;

providing intensity data indicating the intensity of a detected fluorescence emitted by the scintillator;

acquiring at least one peak value of the detected fluorescence based on the intensity data;

determining an occurrence of a pileup in response to the intensity data, the pileup comprising a situation in which, while the intensity of a detected fluorescence emission that is emitted by the scintillator in response to first radiation that has entered the scintillator is attenuating, second radiation enters the scintillator causing the intensity of the detected fluorescence that had been attenuating to increase; and response to determining the occurrence of the pileup, estimating a portion of the intensity of the detected fluorescence emission that was caused by the second radiation entering the scintillator by selecting one of the plurality of first time courses corresponding to a peak value of the detected fluorescence emission, the peak value of the detected fluorescence emission corresponding to a magnitude of intensity of a local maximum of the detected fluorescence emission that most recently occurred before the determination of the occurrence of the pileup, and subtracting the selected first time course from a second time course of the intensity of the detected fluorescence emission over time.

18. The method of detecting radiation according to claim 17, wherein each of the first time courses represent a variation with time of the intensity of the corresponding fluorescence emission monitored while no pileup occurs.

19. The method of detecting radiation according to claim 17, wherein the step of monitoring the intensity data is performed by a free-run method.

20. The method of detecting radiation according to claim 17,
wherein the fluorescence emitted by the scintillator is detected by a photodetector, and
wherein the step of monitoring the intensity data is performed based on data obtained by digitizing an output of the photodetector.

21. The method of detecting radiation according to claim 17, wherein the step of estimating comprises estimating at least three portions of the intensity of the detected fluorescence emission corresponding to at least the first radiation, the second radiation and a third radiation entering the scintillator during the occurrence of plural pileups.

22. The method of claim 17, further comprising selecting plural first time courses, each first time course being selected in response to a magnitude of a corresponding peak value of plural peak values of the detected fluorescence emission.

23. The method of claim 22, further comprising subtracting the selected plural first time courses from the second time course of the intensity of the detected fluorescence.

24. The method of claim 17, further comprising measuring the intensity of fluorescence emissions and storing the measured intensities as the first time courses.

25. The method of claim 17, wherein each of the plurality of first time courses represents a fluorescence detection result without the occurrence of pileup.

26. The method of claim 17, wherein determining the occurrence of a pileup comprises comparing a magnitude of a local minimum of the second time course of the intensity of the detected fluorescence emission to a predetermined threshold.

* * * * *